United States Patent [19]
Gautier et al.

[11] Patent Number: 5,438,910
[45] Date of Patent: Aug. 8, 1995

[54] ASSEMBLY COMPRISING A BULKHEAD AND A PNEUMATIC BRAKE-BOOSTER FOR A MOTOR VEHICLE

[75] Inventors: Jean Pierre Gautier; Ulysse Verbo, both of Aulnay-sous-Bois; Miguel Perez, Argenteuil, all of France

[73] Assignee: Bendix Europe Services Techniques, Drancy, France

[21] Appl. No.: 50,246
[22] PCT Filed: Mar. 24, 1993
[86] PCT No.: PCT/FR93/00291
 § 371 Date: May 6, 1993
 § 102(e) Date: May 6, 1993
[87] PCT Pub. No.: WO93/22171
 PCT Pub. Date: Nov. 11, 1993

[30] Foreign Application Priority Data
 Apr. 30, 1992 [FR] France ............... 92 05326

[51] Int. Cl.⁶ .................................. F15B 9/10
[52] U.S. Cl. ................... 91/369.1; 91/376 R
[58] Field of Search ............. 91/369.1, 369.2, 369.3, 91/376 R; 60/547.1; 92/96

[56] References Cited
U.S. PATENT DOCUMENTS

| | | | |
|---|---|---|---|
| 3,183,789 | 5/1965 | Stelzer | 91/376 R X |
| 4,022,112 | 5/1977 | Putt et al. | 91/376 R |
| 4,274,258 | 6/1981 | Shirai et al. | 91/376 R X |
| 4,433,614 | 2/1984 | Takeuchi et al. | 91/376 R |

FOREIGN PATENT DOCUMENTS

2636286 9/1989 France .
0328759 7/1988 Germany .

*Primary Examiner*—Edward K. Look
*Assistant Examiner*—Hoang Nguyen
*Attorney, Agent, or Firm*—Larry J. Palguta; Leo H. McCormick, Jr.

[57] ABSTRACT

The present invention relates to an assembly comrising a bulkhead (10) separating an engine compartment from a passenger compartment of a vehicle and a pneumatic booster (12) assisting the braking of the vehicle and comprising essentially a tube into which an operating rod (16) actuated by a brake pedal situated in the passenger compartment penetrates and a closed casing defining the pneumatic chambers of the booster disposed in the engine compartment. According to the invention the tube (14) is fastened to a collar (18) which has a diameter substantially smaller than that of the opening; the collar (18) is shaped in such a way as to have, at least in part, an end wall (20) parallel to the bulkhead; the collar (18) has a peripheral groove housing a ring (22); the ring (22) has, at least in part, an elastic edge (24) projecting outwards. Thus, when the booster is in position in the opening, the end wall (20) of the collar abuts against that face of the bulkhead (10) which is situated in the engine compartment and the elastic edge (24) of the ring forms a spacer between the other face of the bulkhead (10) and the groove.

9 Claims, 2 Drawing Sheets

ASSEMBLY COMPRISING A BULKHEAD AND A PNEUMATIC BRAKE-BOOSTER FOR A MOTOR VEHICLE

The present invention relates generally to pneumatic brake-boosters for motor vehicles, and more particularly to an assembly comprising a bulkhead separating the engine compartment from the passenger compartment and a pneumatic brake-booster.

Pneumatic brake-boosters for motor vehicles are fully known in the art and their operation will not be described again here. Generally speaking, they are composed of a leaktight, closed casing defining pneumatic operating chambers of the booster, said casing ending in the passenger compartment of the vehicle in the form of a tube into which an operating rod actuated by the brake pedal situated in the passenger compartment penetrates. The conventional master cylinder is situated at the other end of the casing.

The fastening of the booster to the bulkhead of the vehicle is a relatively complex operation. It is usually accomplished by placing the booster in position from the engine compartment, the tube of the booster being introduced into an opening formed in the bulkhead for the purpose. The booster casing or extensions of the casing carries or carry a plurality of fastening screws which pass through the bulkhead, and nuts are then fitted on the screws from the passenger compartment. Consequently, this operation is difficult to robotize and calls for simultaneous action in the engine compartment and in the passenger compartment. The documents GB-A-2 017 852 and GB-A-2 160 603 describe in particular such solutions for mounting the booster on the bulkhead.

The document FR-A-2 636 286 discloses an arrangement for fixing a pneumatic booster to the bulkhead of a motor vehicle, in which the tube of the booster has a frustoconical guide part and an annular groove into which there is clipped an elastic locking ring held against the bulkhead, in the passenger compartment, by means of several retention tabs.

Such a design also necessitates intervention in the passenger compartment in order to dispose the locking ring on the bulkhead. In addition, when the booster is mounted on the bulkhead, a considerable force must be applied on the case of the booster in order to expand the locking ring, so that reinforcement moldings must be provided on the bulkhead to prevent it from deforming. The risk of deforming the case of the booster itself nevertheless remains.

This design is also dangerous because, if the booster is presented slightly askew with respect to the bulkhead, the locking ring will not be received in the entire annular groove, and the booster will only be very imperfectly mounted. In addition, even if the booster is correctly mounted, the inclined shapes of a lateral flank of the annular groove and of one face of the locking ring mean that, during a braking action, the locking ring is stressed to expand radially, and may even be expanded enough to release the booster into the engine compartment during intense braking, leaving the driver use only of his hand brake. In addition, upon each braking action, the locking ring is very highly stressed in shear, and the risks of breaking, deformation or accelerated aging resulting therefrom are not inconsiderable. Finally, if the slit allowing the locking ring to be expanded is behind the retention tabs, the booster can in no way be dismantled from the bulkhead.

The object of the present invention is to obviate these disadvantages and, in particular, to avoid action in the passenger compartment simultaneously with action in the engine compartment. It has the further object of saving time when mounting the booster on the bulkhead on the vehicle assembly line, while at the same time ensuring reliable fixing of the booster, the dismounting of the latter still being possible.

For this purpose, the tube of the booster is fastened to a collar which has a diameter substantially smaller than that of the opening formed in the bulkhead and which is provided with a peripheral groove.

According to the invention, a ring is housed in the peripheral groove and has, at least in part, an elastic edge projecting outwards. Thus, when the booster is in position in the opening, the elastic edge of the ring forms a spacer between the face of the bulkhead situated in the passenger compartment and a radial wall of the peripheral groove.

Advantageously, the end of the collar situated in the passenger compartment has a thread interacting with a nut, and the radial wall of the peripheral groove interacting with the elastic edge of the ring is formed on the nut.

In this way, all the fixing elements are carried by the booster itself, which forms a complete subassembly, and which may thus be installed without any intervention in the passenger compartment.

The invention will now be described by way of non-limiting example with reference to the accompanying drawings, in which.

Figure 1:
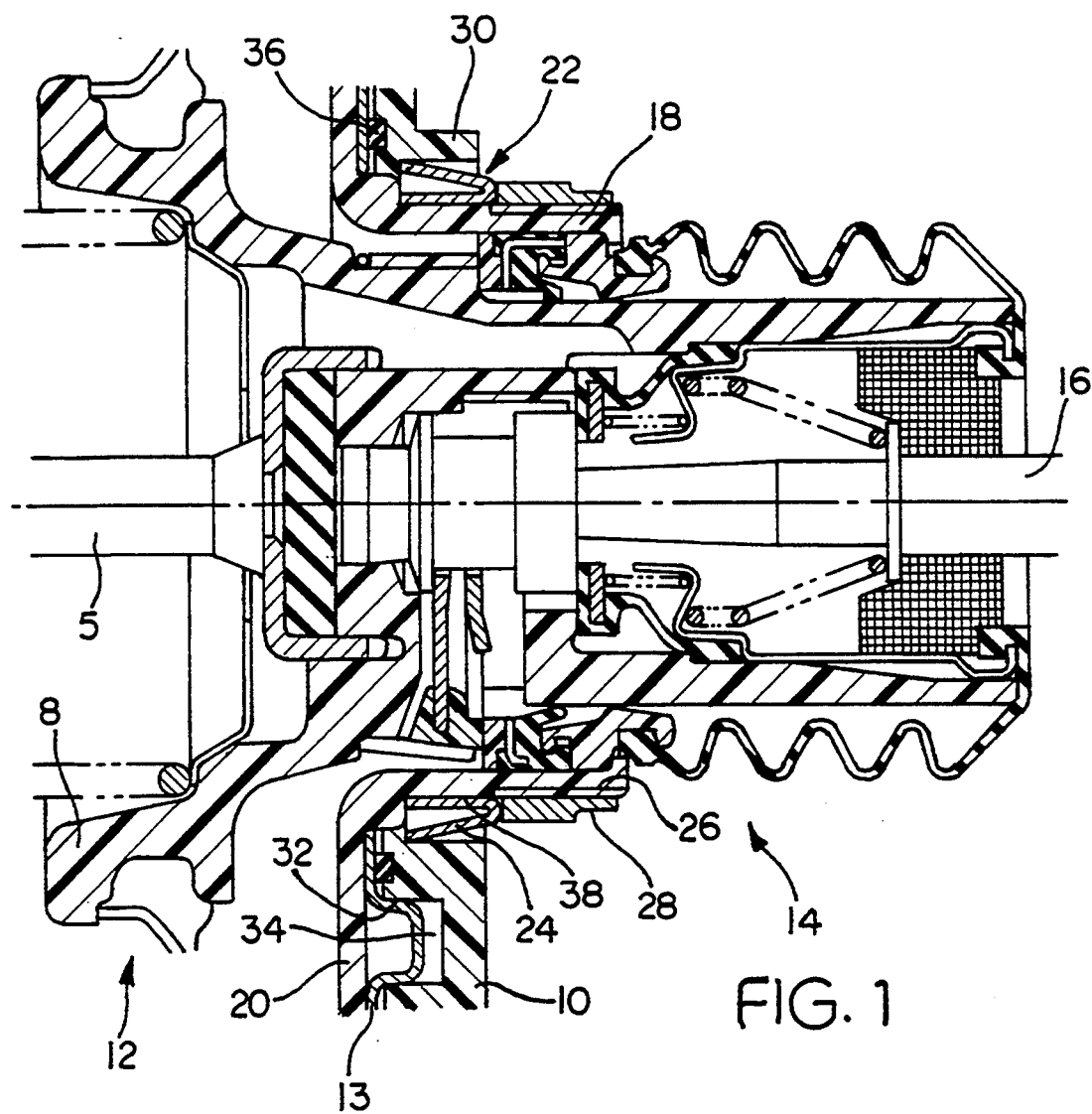
FIG. 1 shows schematically in section an assembly according to a first embodiment of the invention, comprising a booster and a bulkhead fixed to one another in accordance with the invention.

Referring now to the drawings, the booster 12 has not been shown completely because it is well known to those skilled in the art. Only the method of fastening the booster to the bulkhead has been illustrated and made clear. In the same spirit, the components of the booster will not be described here, since they do not as such come within the scope of the invention.

The booster 12 is thus essentially composed of a casing 13 sealingly enclosing an assistance piston 8 driving a thrust rod 6 which comes to bear against the piston of the master cylinder (not shown). Towards the rear, the casing 13 has an extension in the form of a tube passing through an opening in the bulkhead. The operating rod 16 actuated by a brake pedal (not shown) situated in the passenger compartment penetrates into said tube.

The tube 14 has a collar 18, the diameter of which is such that it can pass through the opening formed in the bulkhead 10. The front end of the collar, that is to say the end situated in the engine compartment when the booster is in position, is shaped in such a way as to have an end wall 20 parallel to the bulkhead 10. In the example illustrated, said collar 18 is in practice formed by the tube of the casing 13, the rear wall 20 of which forms the end wall of the collar. It is attached to the interior of the cover of the booster and comprises a cylindrical portion passing through the cover and the bulkhead 10. In other words, the collar and its end wall are integral with the booster casing.

The collar 18 has a peripheral groove 38 in which is disposed a ring 22 having a cylindrical holding part 23 and, at least in part, an elastic edge 24 projecting outwards.

That end of the collar 18 which is intended to enter the passenger compartment of the vehicle is provided with a screw thread 26 cooperating with a nut 28 forming a stop for the ring 22, as will be seen further on. A circular rib 30 defining a support shoulder for the elastic edge 24 of the ring 22 is fastened to the bulkhead 10 and projects into the passenger compartment so as to form a stop for the elastic edge 24.

A seal 36 is disposed between the rear face of the booster casing and the bulkhead face situated in the engine compartment. Advantageously, the seal 36 exerts, on the rear face of the booster casing, a force directed towards the engine compartment, that is to say directed in the direction of actuation of the booster, so as to cancel out all the play due to the manufacturing tolerances and so as not to introduce any additional neutral travel during the operation of the booster. Thus, as has been shown, a gap may exist between the rear face of the booster casing and the front face of the bulkhead.

Finally, a foolproof positioning system may advantageously be provided to ensure that the booster can assume only a single relative angular position in relation to the bulkhead. This foolproof positioning system may, for example, consist of a concave surface 34 which is formed in the bulkhead 10 and into which a complementary convex surface 32 formed on the booster cover penetrates. A foolproof positioning system of this kind is particularly useful when the booster is supplied to the makers of the automobile already equipped with a master cylinder, as is generally the case. Of course, the concave surface can just as well be formed on the cover of the booster in order to interact with a convex surface formed on the bulkhead.

Thus, when a booster is to be placed in position on the bulkhead of the vehicle, the tube of the booster is first inserted through the opening formed in the bulkhead 10. By pressure in the same direction, the elastic edge 24 of the ring is then compressed to pass through said opening. Indentations 25 may be formed in the ring from the elastic edge 24 in order to facilitate the radial compression of this elastic edge 24.

When it emerges from the opening the elastic edge 24 then expands and comes to bear against the rib 30, thus forming a spacer between the bulkhead 10 and the groove 38 and, more particularly, between the bulkhead and the nut 28. In order to do this, said elastic edge 24 must of course be made of a material possessing sufficient rigidity to avoid the buckling of the elastic edge 24 when it is in position, and particularly when the brake is used. The end wall 20 then compresses the seal 36, as has been explained above.

As it has been possible to see, the method of fastening the booster to the bulkhead is thus particularly simple and does not require simultaneous action in the engine compartment and in the passenger compartment.

In addition, if it proves necessary to dismantle the booster, it can clearly be seen that such an operation is still possible by acting on the nut 28 situated in the passenger compartment. Once this nut has been unscrewed, the booster can be extracted from the bulkhead via the engine compartment, and the ring 22 can be withdrawn via the passenger compartment.

The booster can be remounted as during initial mounting, by disposing the ring 22 in the groove 38, by screwing the nut 28 onto the thread 26, and by inserting the booster thus equipped in the opening made in the bulkhead 10.

Figure 2:
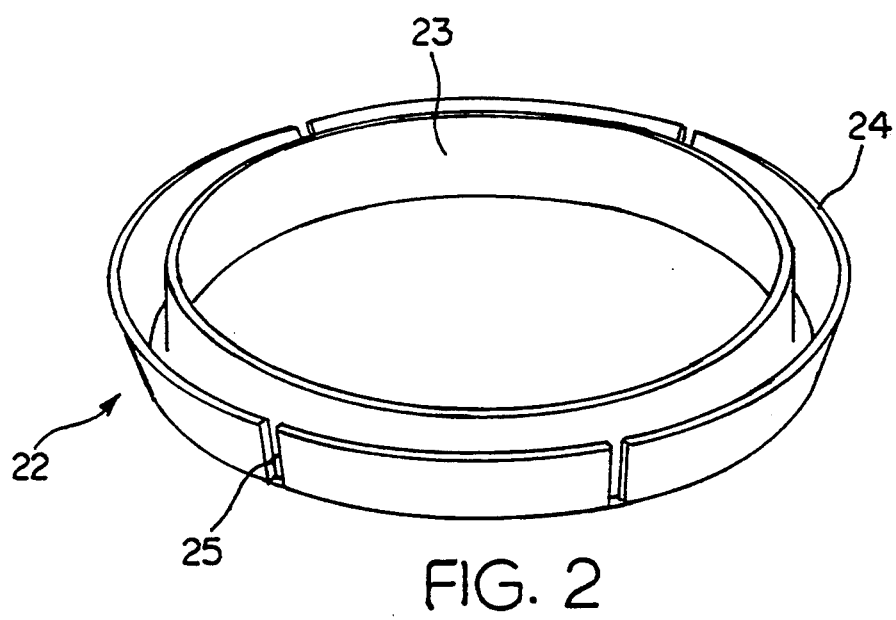
FIG. 2 shows schematically in perspective the ring fastening the booster to the bulkhead in the embodiment illustrated in FIG. 1.
Figure 4:
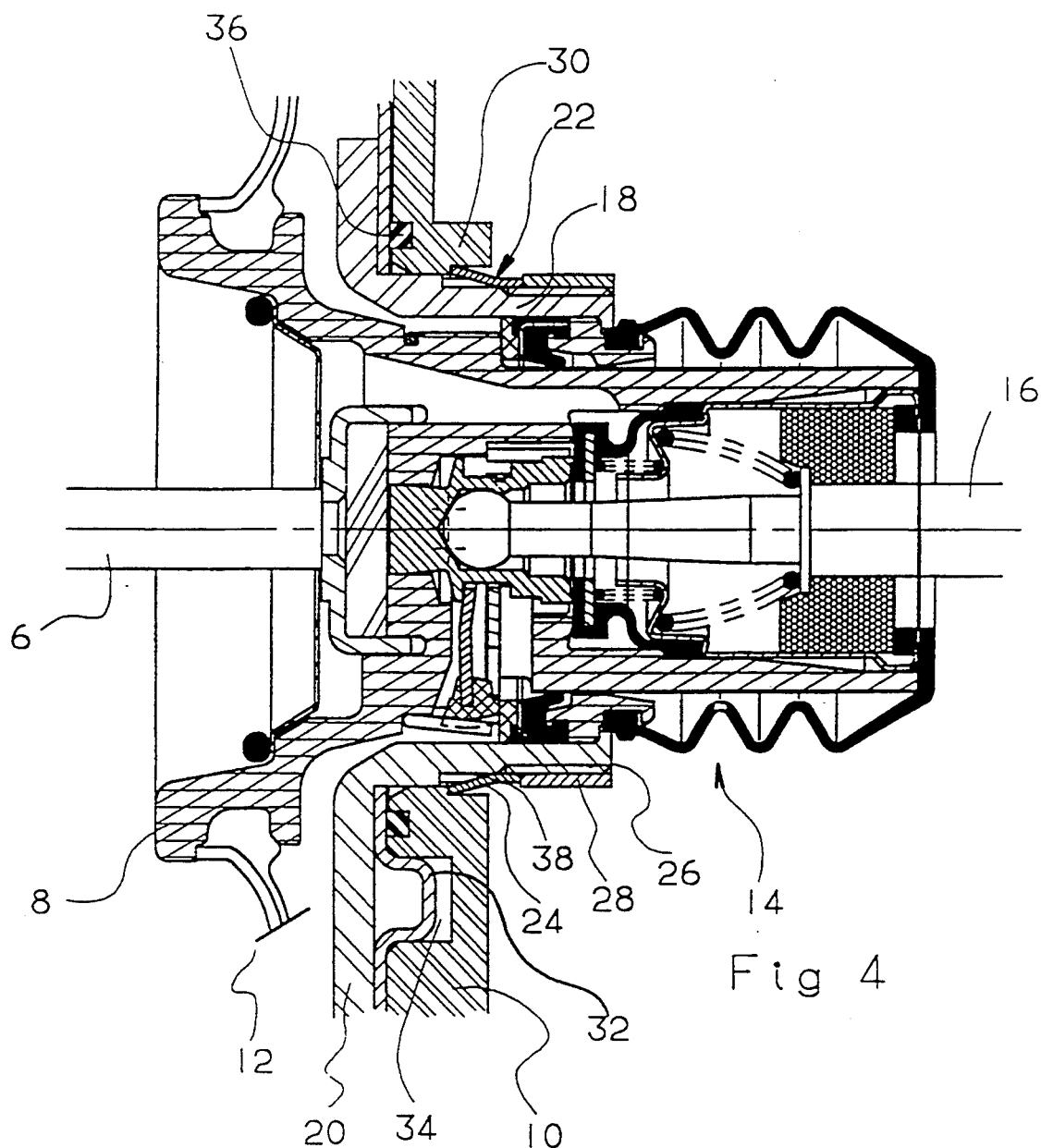
FIG. 4 shows the ring according to FIG. 3 in the fastening of the booster to the bulkhead.
Figure 3:
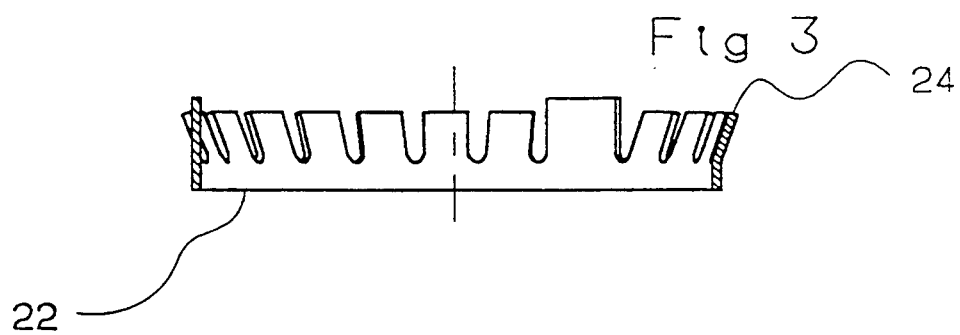
FIG. 3 shows schematically in section a second embodiment of the fastening ring.

Although only one embodiment has been described, it is obvious that any modification made by those skilled in the art, in the same spirit, would not depart from the scope of the present invention. In particular, the ring may be of the type illustrated in FIG. 2, but may also be of annular general shape and be provided with cutouts in order to improve the elasticity of its edge 24, as illustrated in FIGS. 3 and 4. This edge 34 may also be made of a plurality of parts on the periphery. When the collar 18 does not form an integral part of the casing of the booster 12, the end wall 20 of said collar may also be made of a plurality of peripheral parts.

We claim:

1. Assembly comprising a bulkhead separating an engine compartment from a passenger compartment of a vehicle and a pneumatic booster assisting the braking of the vehicle and comprising essentially a tube into which an operating rod actuated by a brake pedal situated in the passenger compartment penetrates and a closed casing disposed in the engine compartment, the bulkhead being provided with an opening formed for the passage of the tube of the booster, the tube being fastened to a collar which has a diameter substantially smaller than that of the opening, and the collar having a peripheral groove, characterized in that a ring is housed in the peripheral groove and has, at least in part, an elastic edge projecting outwardly, in such a manner that, when the booster is in position in the opening, the elastic edge of the ring forms a spacer between a face of the bulkhead situated in the passenger compartment and a radial wall of the peripheral groove.

2. Assembly according to claim 1, characterized in that an end of the collar which is situated in the passenger compartment is provided with a screw thread interacting with a nut.

3. Assembly according to claim 2, characterized in that the radial wall of the peripheral groove interacting with the elastic edge of the ring is formed on the nut.

4. Assembly according to claim 3, characterized in that face of the bulkhead with is situated in the passenger compartment is provided with at least one circular rib forming a stop for the elastic edge.

5. Assembly according to any of claims 1 to 4, characterized in that the collar has at least partially an end wall of substantially circular shape, a seal being disposed between an end wall and a face of the bulkhead which is situated in the engine compartment.

6. Assembly according to claim 5, characterized in that the seal exerts, on the rear face of the booster casing, a force directed towards the engine compartment.

7. Assembly according to claim 5, characterized in that a foolproof positioning system is provided between the end wall of the collar and the bulkhead in order to define a single relative angular position for fastening the booster on the bulkhead.

8. Assembly according to claim 7, characterized in that the foolproof positioning system consists of a concave surface formed in one of the bulkhead and one wall of the booster interacting with a complementary convex surface formed in the other of the one wall of the booster and the bulkhead, respectively.

9. Assembly according to claim 8, characterized in that the collar is formed by an end of the casing, one wall of which constitutes the end wall.

* * * * *